US010759716B2

(12) United States Patent
Mäder et al.

(10) Patent No.: US 10,759,716 B2
(45) Date of Patent: Sep. 1, 2020

(54) ACCELERATOR FOR MINERAL BINDERS

(71) Applicant: SIKA TECHNOLOGY AG, Baar (CH)

(72) Inventors: Gilbert Mäder, Marthalen (CH); Christophe Kurz, Endingen (CH); Beat Marazzani, Oberengstringen (CH); Christian Bürge, Schafisheim (CH)

(73) Assignee: SIKA TECHNOLOGY AG, Baar (CH)

( * ) Notice: Subject to any disclaimer, the term of this patent is extended or adjusted under 35 U.S.C. 154(b) by 371 days.

(21) Appl. No.: 14/894,649

(22) PCT Filed: May 21, 2014

(86) PCT No.: PCT/EP2014/060412
§ 371 (c)(1),
(2) Date: Nov. 30, 2015

(87) PCT Pub. No.: WO2014/191272
PCT Pub. Date: Dec. 4, 2014

(65) Prior Publication Data
US 2016/0107938 A1   Apr. 21, 2016

(30) Foreign Application Priority Data
May 30, 2013 (EP) ..................... 13169868

(51) Int. Cl.
C04B 40/00 (2006.01)
C04B 28/04 (2006.01)
C04B 22/00 (2006.01)
C01B 33/24 (2006.01)
C04B 103/12 (2006.01)
C04B 103/14 (2006.01)

(52) U.S. Cl.
CPC .......... *C04B 40/0039* (2013.01); *C01B 33/24* (2013.01); *C04B 22/00* (2013.01); *C04B 22/0086* (2013.01); *C04B 28/04* (2013.01); C04B 2103/12 (2013.01); C04B 2103/14 (2013.01)

(58) Field of Classification Search
CPC ..... C04B 28/04; C04B 40/0039; C04B 12/04; C04B 14/043; C04B 14/06; C04B 14/28; C04B 20/0076; C04B 22/08; C04B 40/0608; C04B 2103/12; C04B 2103/14; C04B 22/00; C04B 22/0086; C01B 33/24
See application file for complete search history.

(56) References Cited

U.S. PATENT DOCUMENTS

| 2011/0269875 A1 | 11/2011 | Nicoleau et al. |
| 2014/0331899 A1* | 11/2014 | Wombacher .......... C04B 14/043 |
| | | 106/638 |

FOREIGN PATENT DOCUMENTS

| CN | 102216234 A | 10/2011 |
| DE | 202009017741 U1 | 5/2010 |
| EP | 2607329 A1 | 6/2013 |
| GB | 891170 A | 3/1962 |
| GB | 1467717 A | 3/1977 |
| WO | 2015/004196 A1 | 1/2015 |

OTHER PUBLICATIONS

Dec. 26, 2016 Office Action issued in Chinese Patent Application No. 201480031170.4.
Jul. 13, 2017 Office Action issued in Chinese Patent Application No. 201480031170.4.
CD Römpp Chemie Lexikon [Römpp's Chemical Encyclopedia on CD], version 1.0, Georg Thieme Verlag, Stuttgart 1995.
Jul. 1, 2014 Search Report issued in International Patent Application No. PCT/EP2014/060412.
Dec. 1, 2015 International Preliminary Report on Patentability issued in International Patent Application No. PCT/EP2014/060412.
Jan. 17, 2018 Office Action issued in Chinese Application No. 201480031170.4.
Sep. 3, 2018 Office Action Issued in Chinese Patent Application No. 201480031170.4.
Apr. 13, 2018 Office Action issued in Russian Application No. 2015148850/05(075215).
Nov. 15, 2018 Office Action Issued in European Patent Application No. 14 729 611.5.
Aug. 8, 2019 Office Action Issued in European Patent Application No. 19171619.0.
Office Action issued in Columbia Patent Application No. 15303903.
Jun. 23, 2020 Office Action issued in Chinese Patent Application No. 201480031170.4.

* cited by examiner

Primary Examiner — Shuangyi Abu Ali
(74) Attorney, Agent, or Firm — Oliff PLC

(57) ABSTRACT

A method for preparing a setting and hardening accelerator for mineral binders including a step of: (i) reacting a calcium compound CV with a silica sol SL, a molar ratio of Si:Ca being less than 0.1 during the reaction.

15 Claims, No Drawings

ACCELERATOR FOR MINERAL BINDERS

TECHNICAL FIELD

The invention relates to a setting and hardening accelerator for mineral binders, and to a process for production of said accelerator, where a calcium compound is reacted with a silica sol. The invention further relates to the use of the setting and hardening accelerator for accelerating the setting and hardening of mineral binders, and to a binder composition comprising the setting and hardening accelerator.

PRIOR ART

High early strength is increasingly required from finished parts made of concrete or of reinforced concrete, or from renovated sections of trafficways or of runways, the aim being that only a few hours are required before the finished parts can be demolded, transported, stacked, or prestressed, or the trafficways or runways can accept traffic. This objective is achieved in practice not only by using high-performance concrete formulations, for example with low w/c value or high cement content, but also often by applying heat treatments or steam treatments. These treatments require much energy, and therefore this type of treatment is increasingly rejected on grounds of rising energy prices, substantial capital expenditure, and problems related to durability and to visible concrete surfaces; other ways of accelerating the hardening process are being sought.

Accelerating additions have not hitherto provided any satisfactory alternative to heat treatment or steam treatment. There are certainly known substances that accelerate the setting and hardening of concrete, comprising calcium compounds reacted with selected silicon dioxide compounds: by way of example DE202009017741 describes the use of an accelerating addition comprising calcium compounds reacted with fumed silica or with precipitated silica. However, accelerating additions of this type have the disadvantage that they lead to unsatisfactory compressive strength of the hardened concrete.

Accelerating additions of this type moreover often have restricted stability and have an adverse effect on the usage properties of hydraulic binders or mortar or concrete produced therefrom.

DESCRIPTION OF THE INVENTION

It is therefore an object of the present invention to provide accelerating additions, and processes for production thereof, which do not have the abovementioned disadvantages.

The accelerating additions are intended not only to provide a very effective increase of the compressive strength, specifically the early compressive strength after 8 hours, of mineral binder compositions but also to have very good stability in storage for a very long period. The additions are moreover intended to have very little adverse effect on the usage properties of hydraulic binder compositions.

Surprisingly, it has been found that this can be achieved via the process for the production of a setting and hardening accelerator for mineral binders as claimed in claim 1.

Other aspects of the invention are provided by other independent claims. The dependent claims provide particularly preferred embodiments of the invention.

Methods for Implementing the Invention

A first aspect of the present invention comprises a process for the production of a setting and hardening accelerator, hereinafter also termed accelerator, for mineral binders, comprising the following step:

(i) reaction of a calcium compound CV with silica sol SL, with a molar Si:Ca ratio smaller than 0.1 during the reaction.

Purely for the reader's convenience, the abbreviations CV and, respectively; and SL are used for the calcium compound and the silica sol. The abbreviations are in no way to be interpreted as restrictive.

The expression "mineral binder" means in particular a binder which in the presence of water reacts in a hydration reaction to give solid hydrates or hydrate phases. This can by way of example be a hydraulic binder (e.g. cement or hydraulic lime), a latently hydraulic binder (e.g. slag), a pozzolanic binder (e.g. fly ash), or a non-hydraulic binder (e.g. gypsum or white lime).

The expression "cementitious binder" or "cementitious binder composition" here in particular means a binder or binder composition with a proportion of at least 5% by weight of cement, in particular at least 20% by weight, preferably at least 50% by weight, specifically at least 75% by weight.

The mineral binder or the binder composition in particular comprises a hydraulic binder, preferably cement. Particular preference is given to Portland cement, in particular of the type OEM I, II, III, or IV (in accordance with the standard EN 197-1). The entire mineral binder advantageously comprises a proportion of at least 5% by weight of the hydraulic binder, in particular at least 20% by weight, preferably at least 50% by weight, specifically at least 75% by weight. In another advantageous embodiment the mineral binder comprises at least 95% by weight of hydraulic binder, in particular cement.

However, it can also be advantageous that the binder composition comprises, in addition or instead of a hydraulic binder, other binders. These are in particular latently hydraulic binders and/or pozzolanic binders. Examples of suitable latently hydraulic binders and/or pozzolanic binders are slag, fly ash, and/or silica dust. The binder composition can equally comprise inert substances, for example powdered limestone, powdered quartz, and/or pigments. In one advantageous embodiment the mineral binder comprises from 5 to 95% by weight, in particular from 20 to 50% by weight, of latently hydraulic binders and/or pozzolanic binders.

The expression "early compressive strength" in the present context in particular means compressive strength after 8 hours. Compressive strengths are in particular defined in accordance with the standard EN 12390-3.

The molar Si:Ca ratio in the course of the reaction of step (i) is in particular in the range from 0.005 to 0.095. The molar Si:Ca ratio is particularly preferably in the range from 0.01 to 0.08, preferably from 0.03 to 0.06.

The calcium compound CV is typically selected from the group consisting of calcium chloride, calcium nitrate, calcium formate, calcium acetate, calcium bicarbonate, calcium bromide, calcium citrate, calcium chlorate, calcium hydroxide, calcium oxide, calcium hypochloride, calcium iodate, calcium iodide, calcium lactate, calcium nitrite, calcium phosphate, calcium propionate, calcium sulfate, calcium sulfate hemihydrate, calcium sulfate dihydrate, calcium sulfide, calcium tartrate, calcium gluconate, calcium sulfamate, calcium thiocyanate, calcium maleate, calcium fumarate, calcium adipate, and calcium aluminate. It is preferable that the calcium compound CV is selected from the group consisting of calcium nitrate and calcium sulfamate.

It can moreover be advantageous that the calcium compound CV is calcium nitrate, and this is in particular advantageous for high compressive strength, in particular for high compressive strength after 8 h, in hydraulic binders.

It can moreover be advantageous that the calcium compound CV is calcium sulfamate, and this is in particular advantageous for a high flow-table value, in particular for a high flow-table value after 1 min., in hydraulic binders.

The expression "silica sol" in the present document means an aqueous solution of approximately spherical, colloidal polysilicic acid molecules with from 1 to 60% by weight $SiO_2$ content; these can remain unchanged in storage over many years. The appearance of silica sol varies from milky to clear and colorless, depending on the size of the particles.

In particular, the silica sol SL is a silica sol with average particle diameter from 1 to 150 nm, in particular from 1 to 50 nm, preferably from 1.2 to 25 nm, specifically from 1.3 to 20 nm, very particularly preferably from 2 to 9 nm or from 2.2 to 6 nm.

The average particle diameter can be determined by dynamic light scattering (DLS), in particular by photon cross-correlation spectroscopy (PCCS), preferably with NANOPHOX equipment from Sympatec GmbH (Germany). The expression average particle diameter here in particular means the $d_{50}$ value.

The silica sol is produced by way of example via treatment of aqueous alkali metal silicate solutions, also known as water glass, with ion exchangers and stabilization by a little alkali.

The expression "water glass" in the present document means water-soluble salts of silicic acids, in particular potassium silicates and sodium silicates, hardened from the melt flow or aqueous solutions of these, as described in CD Römpp Chemie Lexikon [Römpp's Chemical Encyclopedia on CD], version 1.0, Georg Thieme Verlag, Stuttgart 1995.

Silica sol differs from, by way of example, fumed silica, which is a generic term used for fine-particle silicas produced via flame hydrolysis. That process decomposes silicon tetrachloride in a hydrogen/oxygen flame.

Silica sol also differs by way of example from precipitated silica. This is produced by using mineral acids for precipitation from an aqueous alkali metal silicate solution. This forms colloidal primary particles which agglomerate as reaction proceeds and finally intergrow to give aggregates.

The pH of the silica sol SL is preferably from 3 to 12, in particular from 7 to 12, particularly preferably from 10 to 11. This is advantageous because in hydraulic binders it gives not only high compressive strength, in particular high compressive strength after 8 h, but also a high flow-table value, in particular a high flow-table value after 1 min., together with good stability of the accelerator.

A pH of from 7 to 9 of the silica sol SL contributes to achievement of particularly high compressive strength in hydraulic binders.

A pH of from 3 to 5 of the silica sol SL contributes to achievement of an advantageous flow-table value in hydraulic binders.

If silica sol SL with pH in the range from 7 to 12, particularly preferably from 10 to 11, is used, particularly advantageous compressive strengths and processing properties are obtained from hydraulic compositions. At the same time, particularly good stability of the accelerator is achieved.

The silica sol SL is preferably an aqueous solution or suspension with from 3 to 30% by weight $SiO_2$ content, in particular from 4 to 20% by weight, with particular preference from 10 to 18% by weight.

The reaction of the calcium compound CV with the silica sol SL in step (i) preferably takes place in the presence of a solvent. Examples of suitable solvents are water, alcohols, and/or polyalcohols, in particular glycol, glycerol, ethanol, or isopropanol. Water is the most preferred solvent here.

In particular, the form in which the calcium compound CV is used as initial charge prior to the reaction in (i) is that of a solution comprising the calcium compound CV, in particular of an aqueous solution comprising the calcium compound CV. The solution comprising the calcium compound CV here comprises the calcium compound CV, a solvent, and optionally other substances. In particular, water is used as solvent. The calcium solution advantageously comprises a concentration in the range from 5 to 80% by weight of the calcium compound CV, in particular from 30 to 70% by weight, more preferably from 40 to 60% by weight.

In particular, the pH of the calcium compound CV or of the calcium solution is from 2 to 10, preferably from 3 to 9, particularly preferably from 4 to 8, particularly from 5 to 7. Specifically, the pH of the calcium compound CV or the calcium solution is <7.

In particular, therefore, the reaction of the calcium compound CV with the silica sol SL in step (i) takes place in the presence of water, in particular in aqueous solution. The reaction in step (i) in particular comprises a precipitation reaction between the calcium compound CV and the silica sol SL. The calcium compound CV is reacted with the silica sol SL in particular to give a calcium silicate hydrate suspension.

During the reaction in step (i) the system preferably comprises a proportion of from 25 to 95% by weight of solvent, in particular water, in particular from 30 to 60% by weight, in particular from 35 to 50% by weight, based on the weight of the entire reaction mixture.

It is moreover advantageous that the calcium compound CV and the silica sol SL are used as initial charge separately from one another in the form of aqueous solutions or suspensions.

The reaction in step (i) preferably takes place in a liquid-phase reactor selected from the group consisting of Sulzer-mixer reactor, reactor with external recirculation, cascade reactor, loop reactor, stirred reactor, and reactor with rotor-stator mixer. Preferred liquid-phase reactors are in particular stirred reactors, static mixers, and reactors with rotor-stator mixer.

The reaction of the calcium compound CV with the silicon compound SV, or step (i) of the process, in particular, takes place at pH from 2 to 12, in particular from 2 to 8, preferably from 2.5 to 7, specifically from 3 to 6.5, particularly preferably from 3 to 4.

It is particularly preferable that the reaction of the calcium compound CV with the silicon compound SV, or step (i) of the process, takes place under acidic conditions. pH<7, in particular <6, preferably <5 or <4, is advantageous.

If necessary, the pH can be adjusted to the desired value, in particular a prespecified value, before and/or during the reaction of the calcium compound CV with the silicon compound SV, or step (i), via addition of an acid and/or base.

In one advantageous embodiment the pH is adjusted via addition of an acid before and/or during step (i). The acid is in particular an organic acid, preferably a carboxylic acid, in particular a $C_1$-$C_4$ carboxylic acid, preferably acetic acid and/or formic acid. Specifically, formic acid is preferred.

It is preferable that the reaction of the calcium compound CV with the silicon compound SV, or step (i) of the process, takes place in the absence of any hydraulic binder and/or in the absence of any cementitious binder, and/or in the absence of cement. This in particular means that during the reaction the system comprises a proportion of <10% by weight of substances of this type, preferably <5% by weight, specifically <1% by weight, particularly preferably <0.5% by weight, or <0.1% by weight. Specifically, no substances of this type at all are present during the reaction.

Any mixing with substances of this type in particular does not take place until the resultant setting and hardening accelerator is used, said use in particular occurring at a time later than, and/or at a location separate from, the production of the setting and hardening accelerator.

During the reaction in step (i) it is moreover possible to add a compound selected from the group consisting of aluminum salt, aluminum hydroxide, aluminum oxide, magnesium salt, magnesium hydroxide, and magnesium oxide, and in particular these are salts selected from the group consisting of nitrates, nitrites, and/or sulfonates.

It can moreover be advantageous that the process also includes a step (ii) of addition of at least one other hardening-accelerator substance. The at least one other hardening-accelerator substance here preferably comprises one or more aminoalcohols, one or more α-hydroxycarboxylic acids, one or more alkali metal and/or alkaline earth metal thiocyanates, one or more alkali metal and/or alkaline earth metal halides, glycerol, and/or glycerol derivatives.

The at least one other hardening-accelerator substance advantageously comprises an aminoalcohol, in particular N-methyldiethanolamine, and/or a sulfur-containing compound, in particular one or more alkali metal and/or alkaline earth metal thiocyanates, preferably NaSCN.

In particular the system comprises a total proportion of from 1 to 20% by weight of all other hardening-accelerator substances, preferably from 3 to 18% by weight, based on the total weight of the setting and hardening accelerator.

Specifically, a proportion of from 1 to 10% by weight, preferably from 2 to 8% by weight, with particular preference from 4 to 8% by weight, based on the total weight of the setting and hardening accelerator, of an aminoalcohol is used as at least one hardening-accelerator substance. The aminoalcohol is in particular selected from diethanolamine, N-methyldiethanolamine, N-methyldiisopropanolamine, N,N,N',N'-tetrakis(hydroxylpropypethylene-diamine, tris (hydroxymethyl)aminomethane. Particular preference is given to diethanolamine and/or N-methyldiethanolamine. Very particular preference is given to N-methyldiethanolamine. Preference is given to N-methyl-diethanolamine. Surprisingly, it has been found that aminoalcohols have an advantageous effect on compressive strength after 8 hours, and at the same time can improve the stability of the setting and hardening accelerator in storage.

It is likewise advantageous to use a proportion of from 1 to 20% by weight of a sulfur-containing compound, in particular an alkali metal and/or alkaline earth metal thiocyanate, preferably from 5 to 15% by weight, with particular preference from 8 to 12% by weight, based on the total weight of the setting and hardening accelerator. Particular preference is given to alkali metal thiocyanates, specifically sodium thiocyanate or NaSCN.

It can moreover be advantageous that the process also has a step (iii) for the addition of a thickener, in particular selected from the group consisting of cellulose ether, polysaccharide, starch derivative, polyvinyl alcohol, polyacrylate, latex, guar gum, alginate, and polyacrylamide. In particular, the thickener is polyacrylate.

It can moreover be advantageous, however, to add a dispersing agent selected from the group consisting of polycarboxylate, melamine-formaldehyde condensate, naphthalene-formaldehyde condensate, lignosulfonate, and polyoxyalkylene. The dispersing agent: silica sol SL mixing ratio in % by weight is preferably from 0.01 to 30, preferably from 1 to 10, with particular preference from 1.5 to 5.0.

It can also be advantageous, however, to add none of the abovementioned dispersing agents.

Step (i) is typically carried out at a temperature of from −10 to 90° C. and/or at a pressure of from 0.8 to 20 bar. In some circumstances it can also be useful to carry out step (i) under inert gas, e.g. $N_2$, in order to reduce the extent of undesired side-reactions with reactive constituents of air.

It is in particular advantageous for the early strength resulting from the accelerator that the process also has a step (iv) of comminution of the reaction product from step (i). In particular, step (iv) is comminution via stirrer mills, roll mills, colloid mills, rotor-stator mixers, and/or homogenizers, preferably via rotor-stator mixers and/or homogenizers.

It is preferable that the step (iv) leads to an average particle size of from 1000 to 10 nm, preferably from 100 to 10 nm, for the reaction product. This is in particular advantageous for the early strength resulting from the accelerator.

Another aspect of the present invention provides a setting and hardening accelerator produced by one of the abovementioned processes. It is preferable that the setting and hardening accelerator takes the form of solid, e.g. powder, or of liquid. In particular, the accelerator takes the form of colloid, suspension, or aqueous solution.

It is particularly preferable that the accelerator takes the form of suspension. The solids content of the suspension is preferably from 5 to 70% by weight, in particular from 20 to 65% by weight, specifically from 40 to 60% by weight.

An advantageous pH value after completed production of the setting and hardening accelerator is in the range <7, in particular <6, preferably <5 or <4.5.

In particular, the pH is in the range from 2 to 12, in particular from 2 to 8, preferably from 2.5 to 7, specifically from 3 to 6.5, particularly preferably from 3 to 5 or from 3 to 4.5. Accelerators of this type have proven to be ideal in respect of compressive strength increase, usage properties, and stability in storage.

It is preferable that the setting and hardening accelerator per se is in essence free from hydraulic and/or cementitious binders and/or cement. This in particular means that the system comprises a proportion <10% by weight of substances of this type, preferably <5% by weight, specifically <1% by weight, particularly preferably <0.5% by weight or <0.1% by weight.

The setting and hardening accelerator of the invention is used in various sectors, in particular in concrete technology and cement technology. The accelerator is particularly effective as accelerator for compositions based on mineral binders, and this means that it can be used to accelerate the setting and hardening of mineral binders, in particular of hydraulic binders, specifically of rapid-setting cement, and of mortar or concrete produced therefrom. The accelerator of the invention can moreover be used to produce mortar or concrete which has high early strength and high final strength. The setting and hardening accelerator of the invention is therefore particularly suitable when the compositions based on mineral binders have to be capable of bearing loads or bearing traffic very rapidly after application, for example in construction of roads or bridges, in the prefabrication of concrete elements in the case of finished parts made of concrete or of reinforced concrete, or in renovated sections of runways, in particular runways used for aircraft, the aim being that only a few hours are required before the finished parts can be demolded, transported, stacked, or prestressed, or the trafficways or runways can accept traffic.

Hydraulically setting systems or compositions that can be used in principle comprise any of the hydraulically setting substances known to the person skilled in the art in the concrete sector. In particular, these are hydraulic binders such as cements, for example Portland cements or high alumina cements, and respectively mixtures of these with fly ash, silica fume, slag, granulated blast furnace slag, and limestone filler. Other hydraulically setting substances for the purposes of the present invention comprise quicklime. Cement is preferred as hydraulically setting composition. Other materials that can be used are aggregates such as sand, gravel, stone, powdered quartz, and chalk, and also materials conventionally used as additives, such as concrete plasticizers, for example lignosulfonate, sulfonated naphthalene-formaldehyde condensates, sulfonated melamine-formaldehyde condensates, vinyl copolymers or polycarboxylate ethers, accelerators, corrosion inhibitors, retarders, shrinkage reducers, antifoams, or pore-formers.

The accelerator of the invention can be used for the inventive use not only in liquid but also in solid form, either alone or as constituent of an added material. The invention therefore also provides an added material in liquid or solid form comprising at least one accelerator of the invention.

In order to improve usage properties and to prolong usage time after addition of the accelerator of the invention to a mineral binder, the added material preferably comprises a plasticizer, in addition to the accelerator. Plasticizers that can be used comprise by way of example lignosulfonates, sulfonated naphthalene-formaldehyde condensates, sulfonated melamine-formaldehyde condensates, vinyl copolymers or polycarboxylate plasticizers of the type by way of example known as superplasticizers in concrete chemistry, or a mixture thereof.

The accelerator, or the added material comprising the accelerator, can also comprise other constituents. Examples of other constituents are solvents, in particular water, or additives, such as other accelerator substances, for example thiocyanates, nitrates, alkanolamines, aluminum salts, acids, or salts of these. Specific preference is given to the above-mentioned other accelerating substances. Equally, it is possible that by way of example retarders, shrinkage reducers, antifoams, or foam-formers are present in the accelerator.

The accelerator of the invention, or the added material comprising the accelerator, can also be present in solid physical state, for example as powder, flakes, pellets, granules, or in lamellar form, and can be transported and stored without difficulty in said form.

The accelerator of the invention can by way of example be present in the solid physical state, and be mixed with a plasticizer which is likewise present in the solid physical state, and thus be stored or transported over a prolonged period.

The accelerator of the invention, or the added material comprising the accelerator, can, in the solid physical state, also be a constituent of a cement composition in the form of what is known as a dry mix which can be stored over a prolonged period and is typically stored in sacks or in silos prior to use.

It is also possible that the accelerator of the invention, or the added material comprising the accelerator, is added to a conventional concrete composition with, or shortly prior to, or shortly after, the addition of the water. A procedure that has proven to be particularly suitable here is the addition of the accelerator of the invention in the form of an aqueous solution or dispersion, in particular as the water used for mixing, or as part of the water used for mixing, or as part of an added liquid material which, with the water used for mixing, is added to the hydraulic binder.

The accelerator of the invention, or the added material in liquid form, can also be applied by spraying or added onto the binder, the concrete, mortar, and also additional substances, prior to, during, or after the grinding of the mineral binder. By way of example, the mineral binder can be coated to some extent with the accelerator or the added material comprising the accelerator. This permits the production of a binder, in particular cement or latently hydraulic slag, which already comprises the accelerator or the added material comprising the accelerator, and can thus be stored and sold as ready-to-use mixture, for example as what is known as fast-setting cement. After addition of the water used for mixing, this cement has the desired properties of fast setting and high early strength, without any need for addition, at the construction site, of any added material other than the water used for mixing.

Another aspect of the present invention provides a mixture comprising binder and comprising at least one mineral setting binder and at least one setting and hardening accelerator of the invention. Binders that can be used comprise by way of example cement, in particular Portland cements or high alumina cements and respectively mixtures of these with fly ash, silica fume, slag, granulated blast furnace slag, gypsum, and limestone filler or quicklime, a latently hydraulic powder, or inert microscopic powder. Mixtures that can be used comprising binder preferably comprise concrete compositions.

The mixture can moreover comprise other aggregates such as sand, gravel, stone, powdered quartz, and chalk, and also materials conventionally used as additives, such as concrete plasticizers, for example lignosulfonates, sulfonated naphthalene-formaldehyde condensates, sulfonated melamine-formaldehyde condensates, or polycarboxylate ethers (PCE), accelerators, corrosion inhibitors, retarders, shrinkage reducers, antifoams, or foam-formers.

It is preferable that the mixture comprising binder comprises, in addition to the accelerator, at least one plasticizer, preferably a plasticizer based on polycarboxylate ether (PCE).

The quantity used of the accelerator of the invention in order to achieve the desired effect is preferably from 0.01 to 30% by weight, with preference from 0.1 to 10% by weight, based on the weight of the binder. It is also possible to use a plurality of accelerators in a mixture in order to achieve the desired effect.

Another aspect of the present invention provides a process for the production of a mixture comprising binder where the at least one accelerator of the invention is added separately to the binder, or is added after premixing, in the form of solid or liquid added material, to the binder.

Another aspect of the present invention provides the use of an accelerator as described above for accelerating the setting and hardening of a mineral binder. The mineral binder is in particular a binder as described above, preferably a hydraulic binder.

The quantity added of the setting and hardening accelerator here is in particular from 0.01 to 30% by weight, preferably from 0.2 to 20% by weight, with particular preference from 0.1 to 10% by weight, based on the weight of the mineral binder.

The present invention provides an added material that is stable in storage for mineral binders, and also a process for production of said added material, accelerating the setting and hardening process of the hydraulic binders without any adverse effect on usage times, strength development, or the durability of the resultant mortar compositions or concrete compositions. The added material of the invention, and in particular the setting and hardening accelerator of the invention, is therefore particularly suitable when a mineral binder composition has to be capable of bearing loads or bearing traffic very rapidly after application, for example in construction of roads or bridges, in the prefabrication of concrete elements in the case of finished parts made of concrete or of reinforced concrete, or in renovated sections of runways, in particular runways used for aircraft. Only a few hours are therefore required before the finished parts can be demolded, transported, stacked, or prestressed, or the trafficways or runways can accept traffic.

Inventive Examples

Raw Materials Used

TABLE 1 identity and description of the raw materials used.

| | | |
|---|---|---|
| CV1 | $Ca(NO_3)_2 \times 4\ H_2O$ | Yara GmbH&Co, Germany |
| CV2 | $Ca(NO_3)_2$, 50% by weight in $H_2O$ | Yara GmbH&Co, Germany |
| SL | Cembinder 110, particle size 2.5 nm, pH 6, colloidally dissolved polysilicic acid molecules having 7.2% by weight $SiO_2$ content | AkzoNobel, Sweden |
| SL2 | Cembinder 2509, particle size 5 nm, pH 10.5, colloidally dissolved polysilicic acid molecules having 15.4% by weight $SiO_2$ content | AkzoNobel, Sweden |
| GK | Precipitated silica, Sipernat 500, particle size 6 μm, pH 6, water content ≤3% | Evonik Degussa Germany |
| PK | Fumed silica, Aerosil 380, particle size 7 nm, pH (4% dispersion) 4.2, water content ≤2% | Evonik Degussa Germany |
| MDEA | N-Methyldiethanolamine, hardening accelerator | BASF, Switzerland |
| AS | Formic acid, 85% by weight in $H_2O$ | BASF, Switzerland |
| NaSCN | Sodium thiocyanate | CEDA, China |

Production Processes for Accelerator

Inventive accelerators, and also comparative compounds, were produced by the processes described below, where the raw materials used as in table 1 were used in the ratios described in table 2.

The quantities described in table 2 of calcium compound (CV1 and, respectively, CV2) were dissolved in water in a 2 liter beaker to form an initial charge. The stated quantity of silicon compound and, respectively, silica sol (SL and, respectively, SL2) was then added within 15 minutes, and formic acid was used to adjust the pH to a value of 3.8. The water content was about 45% by weight. All weight data are based on the total weight of the accelerator. The contents of the 2 liter beaker were stirred at from 500 to 1000 revolutions per minute by a blade stirrer (RW 20.n, Ika Labortechnik) with diameter 5 cm during addition of the silica sol, and also for a further 5 min.

Throughout the reaction the pH was in the range from 3.8 to 3.9.

In the case of the accelerators B7 and B9-B12, the substances stated in table 2 were added alongside the calcium compound and the silica sol.

The accelerators B1-B6 were produced for comparative purposes, and are not inventive.

The stability of the accelerators in storage was assessed visually. The accelerators are identified as stable in storage as long as these take the form of clear solutions and no precipitation is discernible. The phase identified as stable ends with the first occurrence of clearly discernible precipitation and clouding. Accelerators stable in storage <24 h are identified here as "not stable", and those stable in storage >3 months are identified as "stable".

TABLE 2 accelerators produced

| No. | CV, % by weight* | $SiO_2$ source, % by weight* | Additions, % by weight* | Molar Si:Ca ratio | Stability |
|---|---|---|---|---|---|
| B1 | CV1, 50.5 | GK, 2.7 | — | 0.31 | stable |
| B2 | CV1, 50.5 | PK, 2.7 | — | 0.31 | stable |
| B3 | CV2, 27.1 | SL, 49.7 | — | 0.721 | not stable |
| B4 | CV2, 60.0 | SL, 75.5 | — | 0.495 | stable |
| B5 | CV2, 18.6 | SL, 15.5 | — | 0.328 | stable |
| B6 | CV2, 66.4 | SL, 34.6 | MDEA, 6.0 | 0.205 | stable |
| B7 | CV2, 67.0 | SL, 10.1 | NaSCN, 10 MDEA 6.5 | 0.059 | stable |
| B8 | CV2, 70.8 | SL2, 4.9 | — | 0.058 | stable |
| B9 | CV2, 70.8 | SL2, 4.9 | MDEA, 6.5 | 0.058 | stable |
| B10 | CV2, 70.8 | SL2, 4.9 | NaSCN, 6.5 | 0.058 | stable |
| B11 | CV2, 70.8 | SL2, 4.9 | NaSCN, 10 MDEA 6.5 | 0.058 | stable |
| B12 | CV2, 72 | SL, 5 | NaSCN, 10 MDEA 6.5 | 0.027 | stable |

*= based on the total weight of the respective accelerator

Mortar Tests

The various accelerators in table 2 were admixed with the mortar mixture MM described below (table 3) in order to determine the effectiveness of the accelerators B1-B12.

TABLE 3 dry composition of mortar mixture

| Composition of mortar mixture (MM): (maximum grain size 8 mm) | Quantity in g |
|---|---|
| Portland cement (SVW CEM I 42.5N) | 750 |
| Limestone filler | 141 |
| 0-1 mm sand | 738 |
| 1-4 mm sand | 1107 |
| 4-8 mm sand | 1154 |

Cement used was SVW (Swiss cements from Siggenthal, Vigier, Wildegg, 1:1:1 mixture) CEM I 42.5N, with Blaine fineness about 3400 $cm^2/g$.

Mortar compositions MZ were mixed by dry-mixing the sands, the filler, and the cement of the mortar mixture MM for 1 minute in a Hobart mixer. The water used for mixing, in which the respective accelerator had been dissolved or dispersed (0.71% by weight, based on the total weight of the mortar composition inclusive of water used for mixing) was added within 10 seconds, and mixing was continued for a further 170 seconds. The total wet mixing time was 3 minutes. The water/cement value (w/c value) was 0.4 throughout.

1% by weight (based on the weight of the cement) of a plasticizer (Sika ViscoCrete 3081S, obtainable from Sika Switzerland AG, Switzerland) was also added to all of the mortar compositions, in order to improve the usage properties of the mortar compositions.

One minute after the mixing of the mortar compositions, the respective flow-table value (FT) was measured. The early compressive strength of the mortar mixtures was determined 8 hours after the mixing of the mortar mixtures.

The test for determining compressive strength (in $N/mm^2$) was carried out on prisms (40×40×160 mm) in accordance with the standard EN 12390-1 to 12390-4. The flow-table value (FT) for the mortar was determined in accordance with EN 1015-3.

Table 4 collates the mortar test results. The molar ratio and the stability of the respective accelerators have been listed again in table 4 in order to provide a better overview of the results. MR is a reference sample, produced in a manner analogous to that for the other mortar compositions but without addition of an accelerator.

TABLE 4 mortar test results

| No. | Accelerator | Molar Si:Ca ratio of accelerator | Stability of accelerator | FT (in %) after 1 min. in comp. with MR | Compressive strength (in %) after 8 h in comp. with MR |
|---|---|---|---|---|---|
| MR | — | — | — | 100 | 100 |
| MZ1 | B1 | 0.31 | stable | 105 | 156 |
| MZ2 | B2 | 0.31 | stable | 109 | 161 |
| MZ3 | B3 | 0.721 | not stable | 62 | 333 |
| MZ4 | B4 | 0.495 | stable | 59 | 356 |
| MZ5 | B5 | 0.328 | stable | 77 | 322 |
| MZ6 | B6 | 0.205 | stable | 72 | 467 |
| MZ7 | B7 | 0.059 | stable | 90 | 466 |
| MZ8 | B8 | 0.058 | stable | 103 | 488 |
| MZ9 | B9 | 0.058 | stable | 95 | 492 |
| MZ10 | B10 | 0.058 | stable | 94 | 490 |
| MZ11 | B11 | 0.058 | stable | 105 | 500 |
| MZ12 | B12 | 0.027 | stable | 100 | 489 |

Table 4 in particular shows that although some of the accelerators B3-B6 based on silica sol with a molar Si:Ca ratio above 0.1 are stable, they have a major adverse effect on usage properties and, respectively, flow-table value (FT) (see MZ4-MZ6). In contrast, the accelerators B7-B12 of the invention, molar Si:Ca ratio below 0.1, are all stable, give good usage properties (FT being at least 90% of that of the comparative example MR), and bring about a very large increase in compressive strength (increase at least 466% in comparison with the reference sample MR).

The increase in compressive strength can be further improved by adding other hardening-accelerator substances (NaSCN and, respectively, MDEA) (cf. MZ9-MZ11 in comparison with MZ8). This is in particular the case for a combination of two additional hardening-accelerator substances (MZ/1); surprisingly, said combination provides a significant improvement of compressive strength and also particularly advantageous usage properties.

The results are evidence that the accelerators produced in accordance with the invention have good stability on storage and at the same time give very large increases in compressive strength, and also good usage properties in mineral binder compositions.

What is claimed is:

1. A process for the production of a setting and hardening accelerator for mineral binders, comprising the following step:
   (i) reaction of a calcium compound CV with silica sol SL; wherein during the course of the reaction of step (i) a molar Si:Ca ratio is in the range from 0.027 to 0.058; wherein the setting and hardening accelerator increases a compressive strength, after 8 hours, of a mineral binder composition by a percentage in a range from 488% to 500% relative to an index of 100% for the same mineral binder composition without said setting and hardening accelerator.

2. The process as claimed in claim 1, wherein in step (i) the reaction of the calcium compound CV with silica sol SL takes place in the presence of water, with a proportion of water that is based on the weight of the entire reaction mixture.

3. The process as claimed in claim 1, wherein the calcium compound CV and silica sol SL are added separately from one another to the water.

4. The process as claimed in claim 1, wherein the calcium compound CV is selected from the group consisting of calcium chloride, calcium nitrate, calcium formate, calcium acetate, calcium bicarbonate, calcium bromide, calcium citrate, calcium chlorate, calcium hydroxide, calcium oxide, calcium hypochloride, calcium iodate, calcium iodide, calcium lactate, calcium nitrite, calcium phosphate, calcium propionate, calcium sulfate, calcium sulfate hemihydrate, calcium sulfate dihydrate, calcium sulfide, calcium tartrate, calcium gluconate, calcium sulfamate, calcium thiocyanate, calcium maleate, calcium fumarate, calcium adipate, and calcium aluminate.

5. The process as claimed in claim 4, wherein the calcium compound CV is calcium nitrate.

6. The process as claimed in claim 1, wherein the pH of the silica sol SL is from 3 to 12.

7. The process as claimed in claim 1, wherein the silica sol SL is a silica sol with average particle diameter from 1 to 150 nm.

8. The process as claimed in claim 1, wherein
   a) the calcium compound CV is calcium nitrate, and
   b) the average particle diameter of the silica sol SL is from 2 to 9 nm, and
   c) during the course of the reaction of step (i) the molar Si:Ca ratio is in the range from 0.01 to 0.08, and
   d) the reaction of the calcium compound CV with silica sol SL takes place in the presence of water at pH from 3 to 6.5.

9. The process as claimed in claim 1, wherein at least one other hardening-accelerator substance is added, wherein the at least one other hardening-accelerator substance comprises one or more aminoalcohols, one or more α-hydroxycarboxylic acids, one or more alkali metal and/or alkaline earth metal thiocyanates, one or more alkali metal and/or alkaline earth metal halides, glycerol, and/or glycerol derivatives.

10. The process as claimed in claim 9, wherein another hardening-accelerator substance comprises an aminoalcohol, and/or one or more alkali metal and/or alkaline earth metal thiocyanates.

11. The process as claimed in claim 9, wherein the proportion of the at least one other hardening-accelerator substance is from 1 to 20% by weight, based on the total weight of the setting and hardening accelerator.

12. A setting and hardening accelerator produced by a process as claimed in claim 1.

13. A binder-containing mixture comprising at least one mineral binder, and at least one setting and hardening accelerator as claimed in claim 12, wherein the setting and hardening accelerator increases a compressive strength, after 8 hours, of binder containing mixture by a percentage in a range from 488% to 500% relative to an index of 100% for the same mineral binder composition without said setting and hardening accelerator.

14. A method comprising: accelerating the setting and the hardening of the mineral binder composition by mixing the setting and hardening accelerator as claimed in claim 12 into the mineral binder composition, wherein the setting and hardening accelerator increases a compressive strength, after 8 hours, of the mineral binder composition by a percentage in a range from 488% to 500% relative to an index of 100% for the same mineral binder composition without said setting and hardening accelerator.

15. The process as claimed in claim 1, wherein the calcium compound CV is selected from the group consisting of calcium nitrate and calcium sulfamate.

\* \* \* \* \*